No. 853,648. PATENTED MAY 14, 1907.
T. B. POWERS.
ELECTRIC CLOCK.
APPLICATION FILED MAY 12, 1906.

3 SHEETS—SHEET 1.

Attest:

Inventor:
Timothy B. Powers
by Redding, Kiddle & Greeley
Attys.

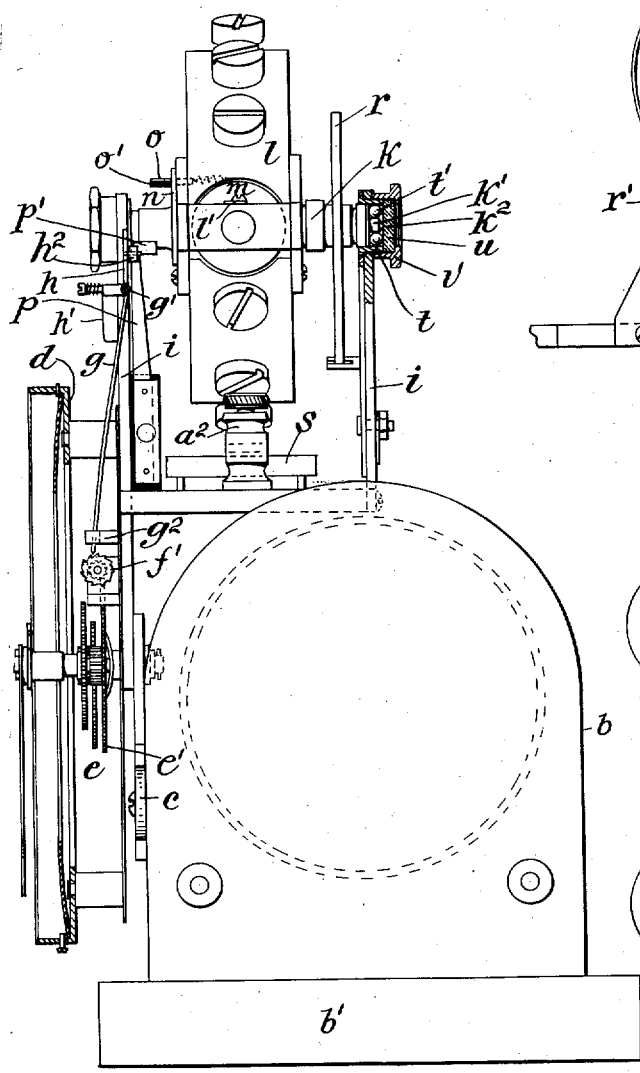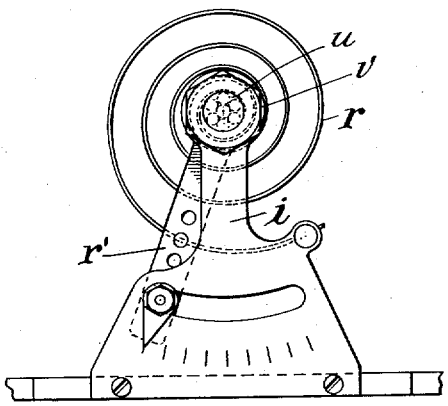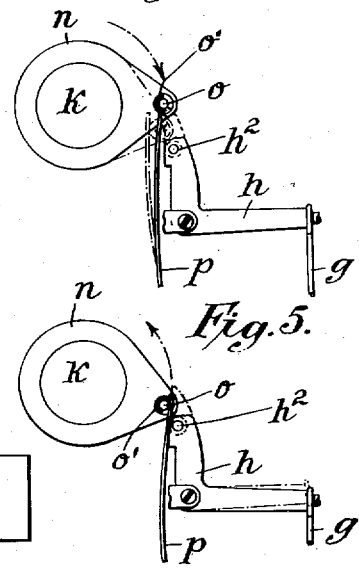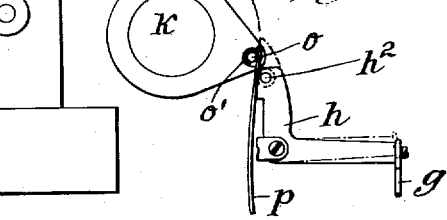

No. 853,648. PATENTED MAY 14, 1907.
T. B. POWERS.
ELECTRIC CLOCK.
APPLICATION FILED MAY 12, 1906.

3 SHEETS—SHEET 3.

UNITED STATES PATENT OFFICE.

TIMOTHY B. POWERS, OF NEW YORK, N. Y., ASSIGNOR TO KUTNOW BROS., OF NEW YORK, N. Y.

ELECTRIC CLOCK.

No. 853,648.      Specification of Letters Patent.      Patented May 14, 1907.

Application filed May 12, 1906. Serial No. 316,435.

*To all whom it may concern:*

Be it known that I, TIMOTHY B. POWERS, a citizen of the United States, residing in the borough of Manhattan, in the city of New York, State of New York, have invented certain new and useful Improvements in Electric Clocks, of which the following is a specification, reference being had to the accompanying drawings, forming a part hereof.

This invention relates to clocks and watches in which the oscillations of the balance wheel are maintained by electric energy derived from any suitable source.

Figure 1:
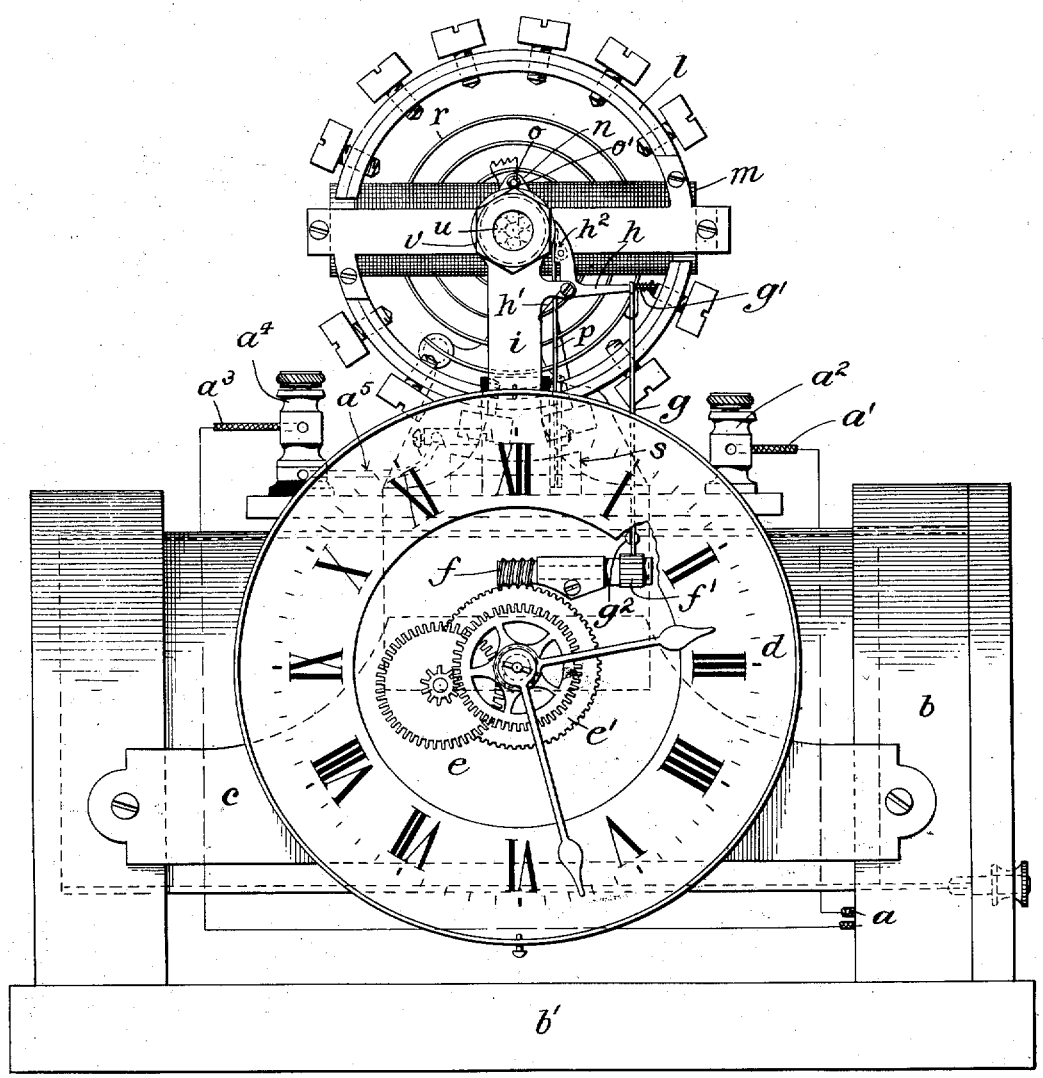
Figure 6:
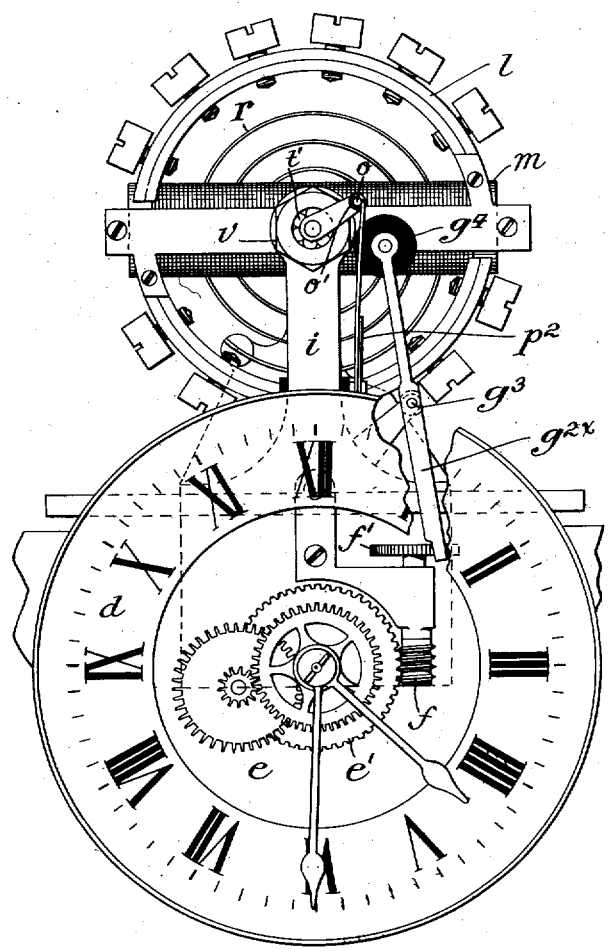

The principal objects of the invention are to obtain the maximum of simplicity in construction, whereby liability to derangement is reduced, and high efficiency in the operation of the mechanism, whereby the amount of battery power required is reduced to a minimum and a battery of sufficient capacity to operate the clock for a long period of time can be inclosed within the clock casing without making the same unsightly or clumsy. Incidentally to these main objects, it has been sought to keep the cost of construction low, to make the entire mechanism with its actuating battery, if one be applied directly to the mechanism, as compact as possible and to secure novelty and attractiveness in appearance. These objects are attained primarily by mounting the actuating magnet upon the oscillating balance wheel and mounting the armature in a fixed position, the electric connections and co-operating devices being combined therewith in a suitable manner. This combination of parts enables a high efficiency to be obtained, the poles of the magnet being located at the periphery of the oscillating balance wheel so that the impulse which accelerates or renews its motion is given to it at the instant of its most rapid motion and the maximum amplitude of oscillation is attained. Not only is the waste of energy in starting an armature from a condition of rest at each energization of the magnet thus avoided, but the amount of electrical energy required to maintain the oscillations of the balance wheel is so small that a single cell of an ordinary dry battery will suffice to keep the clock in operation for a long period of time. Various details of construction have also been improved with a view to the attainment of the several objects above named, all as will be more fully explained hereinafter with reference to the accompanying drawings in which Figure 1 is a view in front elevation of a clock which embodies in desirable form the present improvements. Fig. 2 is a view thereof in end elevation, the clock face and one of the bearings of the balance wheel being shown in section. Fig. 3 is a detail view in elevation showing the hair spring and regulating device. Figs. 4 and 5 are detail views illustrating the operation of the contact devices. Fig. 6 is a detail view illustrating a slight modification of the devices for transmitting movement from the balance wheel to the clock train.

In the clock represented in the drawings the actuating battery is represented as incorporated with the clock, although, as will be readily understood, in clocks or time pieces of a different type it may be desirable to derive the electric energy from some suitable source remote from the clock mechanism. As shown, a single cell of an ordinary dry battery, sufficiently represented by the terminals at $a$, is received in a suitable case $b$ mounted upon a base $b'$ which supports the entire mechanism. A bracket $c$, secured to the case $b$, supports the clock face $d$ and a simple clock train $e$ which is of ordinary construction and requires no detailed description herein except to note that it is shown as having a worm actuating gear $e'$. The latter is engaged by a driving worm $f$ on the shaft of which, mounted in a suitable bearing, is a ratchet wheel $f'$. The latter is operated by a driving dog $g$ which, in the construction shown in Figs. 1 and 2, is a rod upon one arm of a bell crank lever $h$ and pressed by a coil spring $g'$ toward the ratchet wheel $f'$, reciprocating in a guide $g^2$. The bell crank lever $h$ is restored by a spring $h'$ to normal position after actuation by the balance wheel in the manner hereinafter described.

In suitable standards $i$ is mounted the shaft $k$ of a divided, compensating balance wheel $l$ which is of usual construction except that it has mounted therein so as to oscillate therewith the single-core actuating magnet $m$, the poles of which are at the periphery of the balance wheel. The shaft $k$ is provided with an arm $n$ in which is mounted a contact pin $o$ insulated from the arm $n$ by a fiber bushing $o'$, which is cut away to expose to contact the pin on one side, as shown in Figs. 2, 4 and 5. Upon the supporting frame work is mounted an insulated contact spring $p$ having an L-shaped head $p'$, the shank of the head standing directly in front of a pin and roller $h^2$ carried by the bell crank lever $h$. Head $p'$ of the spring $p$ is so placed with reference to the path of movement of the pin $o$, as it oscillates with the balance wheel, that in the oscillation to the right, indicated in Fig. 4, the pin $o$ with its bushing $o'$ pass to the right of the spring head, throwing the spring to the left slightly, as indicated by dotted lines in Fig. 4, the pin $o$ making no electrical contact therewith by reason of the interposition of the bushing $o'$. The bell crank lever $h$, likewise, is not actuated during this movement as the spring $p$ is thrown away from the pin and roller $h^2$. In the oscillation to the left, however, as indicated in Fig. 5, the pin $o$ comes up in front of the spring head $p'$ and makes electrical contact therewith, at the same time throwing the spring back against the pin and roller $h^2$ and rocking the lever $h$ upon its pivot, as indicated in Fig. 5, and thereby driving the dog $g$ in a direction to actuate the ratchet wheel $f'$ and so give the clock train a forward movement.

The shaft $k$ on the balance wheel has applied thereto a hair spring $r$ provided with the usual regulating device $r'$, as shown in Fig. 3. The hair spring gives the return movement of oscillation to the balance wheel after the energy of the actuating magnet $m$ has been expended, the energy of such magnet acting upon an armature $s$ which is fixed to the supporting frame and in close proximity to the path of movement of the poles of the magnet $m$.

As shown in Fig. 1, the armature $s$ is of extended length and on the same radial line as the poles of the magnet $m$, so that the magnet, in its oscillation with the balance wheel, has time to discharge its magnetism and thereby avoid any retardation which might be occasioned by residual magnetism and so decrease the efficiency of the mechanism, and influence the time-keeping quality of the clock.

As will be understood by reference to Fig. 1, one pole of the battery is connected by a suitable conductor $a'$ to the binding post $a^2$ on the supporting frame work. Thence current is conducted through the supporting frame work and the hair spring $r$ to the balance wheel $l$ and from a binding post $l'$ thereon directly to one end of the magnet coil $m$, the other end of such coil being connected to the insulated pin $o$. The other pole of the battery is connected by a suitable conductor $a^3$ to an insulated binding post $a^4$, from which connection is made, as indicated at $a^5$, to the insulated contact spring $p$. The pin $o$ is so placed with respect to the poles of the magnet that it makes contact with the contact spring $p$, as indicated in Fig. 5, just as the pole of the magnet approaches the fixed armature $s$ near enough to include it within the magnetic field, and breaks the contact just as the magnetic pull upon the balance wheel attains its maximum, so that there is no retardation. By these means the balance wheel receives, through the momentary energization of the magnet $m$, an impetus just sufficient to maintain the oscillation of the balance wheel. When that impetus is expended the hair spring $r$ acts to return the balance wheel to the limit of its movement in the opposite direction and then again to give movement in the forward direction until the pole of the magnet again approaches the armature.

It will be observed that the arrangement of the oscillating magnet and balance wheel upon the horizontal axis, with the armature stationary beneath the balance wheel, permits a very close adjustment of the armature with respect to the poles of the oscillating magnet to be maintained without regard to any looseness of fit that there may be of the shaft in its bearings, so that the efficiency of the mechanism can be maintained at its maximum. Furthermore, this arrangement permits the employment of a feature of construction which is not only useful but adds to the attractiveness of the mechanism. That is to say, the shaft of the balance wheel is supported not only in general bearings, but with an end thrust pivot bearing, so that the clock will run in any position, and at the same time the ball or roller journal bearing is visible, forming an attractive feature.

In each of the two standards $i$ is mounted a sleeve $t$ which forms a cup for bearing balls $t'$, the end of the shaft $k$ being reduced as at $k'$ to bear on the balls. The end of the sleeve $t$ is closed by a disk $u$ of flint glass, which is held in place by a bezel or beaded sleeve $v$ which has a screw threaded engagement with the sleeve $t$. The extremity of the shaft $k$ is tapered to a point, as at $k^2$, to have a pivot bearing against the glass disk $u$. If the clock, therefore, is tipped forward or back the mechanism will continue to operate without retardation and the ball bearings being visible through the glass form an attractive and ornamental feature.

It is obvious that various changes may be made in details of construction and arrangement without departing from the spirit of the invention. One such modification of the transmission devices is illustrated in Fig. 6, wherein the worm $f$ is arranged vertically and the ratchet wheel $f'$ thereof is engaged by a dog $g^{2\times}$ which oscillates upon a pivot $g^3$. The upper end of the dog $g^{2\times}$ carries an insulated head $g^4$ which stands behind the insulated contact spring $p^2$, with which the contact pin $o$ of the balance wheel makes contact in its movement in each direction, thus effecting the energization of the magnet once in each complete oscillation and actuating the clock train $e$, through the worm wheel $e^7$, twice for each complete oscillation.

It will be understood that the contact pin $o$ of the construction shown in Fig. 6 is mounted and insulated in the same manner as in the construction shown in Figs. 1, 2, 4 and 5 and therefore need not be further illustrated. The contact spring $p^2$ is an ordinary flat spring standing in the path of movement of the pin $o$, yielding to permit the pin to have the desired movement while completing the circuit at each contact.

Various other modifications in detail will suggest themselves, and it is to be understood that the invention is not limited to the precise construction and arrangement of the parts shown and described herein.

I claim as my invention:

1. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, a stationary armature located in proximity to the path of a pole of the magnet, and circuit connections and contacts whereby the magnet is momentarily energized to add an impulse to the oscillation of the wheel as a pole of the magnet approaches the armature.

2. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, a stationary armature located in proximity to the path of a pole of the magnet, and circuit connections and contacts whereby the magnet is momentarily energized to add an impulse to the oscillation of the wheel as a pole of the magnet approaches the armature, one of the contacts being carried by the wheel and another co-operating contact being mounted on a fixed support in the path of the first contact.

3. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, a stationary armature located in proximity to the path of a pole of the magnet, circuit connections and contacts whereby the magnet is momentarily energized to add an impulse to the oscillation of the wheel as a pole of the magnet approaches the armature, and means for varying the number of oscillations of the wheel in a given period of time.

4. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of a pole of the magnet, and circuit connections and contacts whereby the magnet is momentarily energized to add an impulse to the oscillation of the wheel as a pole of the magnet approaches the armature.

5. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of a pole of the magnet, and circuit connections and contacts whereby the magnet is momentarily energized to add an impulse to the oscillation of the wheel as a pole of the magnet approaches the armature, one of the contacts being carried by the wheel and another co-operating contact being mounted on a fixed support in the path of the first contact.

6. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of a pole of the magnet, a contact pin carried by the balance wheel and insulated on one side, a contact spring having a broad L-shaped head located in the path of movement of the pin whereby the pin passes on one side of said head in one direction and on the other side of said head in the other direction, and circuit connections.

7. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of movement of a pole of the magnet, a contact carried by the balance wheel, a contact spring located in the path of the first named contact, transmission devices having a portion located in proximity to the spring to be actuated thereby, and circuit connections.

8. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of movement of a pole of the magnet, a contact carried by the balance wheel, a contact spring located in the path of the first named contact, a lever mounted in proximity to the contact spring to be actuated thereby, means whereby the movement of the lever is made to actuate the clock train, and circuit connections.

9. The combination of a single-core electro-magnet mounted to oscillate upon an adverse axis between its poles and forming a part of a rotary balance wheel with its core radial and its poles at the periphery of such wheel, a coiled spring having one end secured to said wheel and the other secured to a fixed point, means for transmitting forward motion from the oscillating balance wheel to the clock train, a stationary armature located in proximity to the path of movement of a pole of the magnet, a contact carried by the balance wheel, a yielding contact located in the path of the first named contact, a power transmitting device in proximity to the yielding contact to be operated thereby and in turn to actuate the clock train, and circuit connections.

This specification signed and witnessed this  th day of May, A. D., 1906.

TIMOTHY B. POWERS.

In the presence of—
   Lucius E. Varney
   Ella J. Kruger.